United States Patent
Jalili (10) Patent No.: US 10,250,160 B2
(45) Date of Patent: Apr. 2, 2019

(54) METHOD FOR CONTROLLING A PHOTOVOLTAIC INVERTER FOR NETWORK FAULT RIDE-THROUGH AND A PHOTOVOLTAIC INVERTER SYSTEM

(71) Applicant: GE Energy Power Conversion Technology Ltd, Warwickshire (GB)

(72) Inventor: Kamran Jalili, Berlin (DE)

(73) Assignee: GE ENERGY POWER CONVERSION TECHNOLOGY LTD, Rugby, Warwickshire (GB)

( * ) Notice: Subject to any disclaimer, the term of this patent is extended or adjusted under 35 U.S.C. 154(b) by 0 days.

(21) Appl. No.: 15/789,482

(22) Filed: Oct. 20, 2017

(65) Prior Publication Data
US 2018/0115255 A1 Apr. 26, 2018

(30) Foreign Application Priority Data
Oct. 20, 2016 (DE) .................. 10 2016 120 033

(51) Int. Cl.
*H02M 7/537* (2006.01)
*H02J 3/38* (2006.01)
(Continued)

(52) U.S. Cl.
CPC .............. *H02M 7/537* (2013.01); *G05F 1/67* (2013.01); *H02J 3/385* (2013.01); *H02M 1/32* (2013.01)

(58) Field of Classification Search
CPC ................................. H02M 7/537; H02M 1/32
See application file for complete search history.

(56) References Cited

U.S. PATENT DOCUMENTS 8,687,328 B2 4/2014 Yin et al.
9,843,288 B2 * 12/2017 Chaintreuil ............. H02S 50/10
(Continued)

FOREIGN PATENT DOCUMENTS

EP 2 328 262 A2 6/2011
WO 2013/163266 A1 10/2013

OTHER PUBLICATIONS

"Technical Guidelines: Power Generation Plants at the Medium Voltage Network (Guidelines for Connection and Parallel Operation of Power Generation Plants at the Medium Voltage Network]," BDEW, pp. 21-29, (Jun. 2008).

(Continued)

*Primary Examiner* — Emily P Pham
(74) *Attorney, Agent, or Firm* — GE Global Patent Operation; Scott R. Stanley (57) ABSTRACT

An inverter and method of controlling an inverter, which is connected between a photovoltaic generator and a power supply network for ride-through of a network fault, is disclosed. A voltage dip is detected in the network voltage and the voltage of a DC voltage link of the inverter is monitored. When the DC link voltage exceeds an upper limit value, an operating mode for ride-through of the network fault is started. The upper limit value corresponds to a saturation voltage in the specific $I_{ac}/U_{dc}$ characteristic curve of the inverter, above which the maximum AC output current of the inverter decreases. In the FRT operating mode, an energy dissipation device dissipates power from the DC voltage link and is controlled to keep the DC link voltage within a range below the saturation voltage.

15 Claims, 5 Drawing Sheets

(51) Int. Cl.
*H02M 1/32* (2007.01)
*G05F 1/67* (2006.01)

(56) References Cited

U.S. PATENT DOCUMENTS

| 2011/0013432 A1 | 1/2011 | Wagoner |
| 2011/0128760 A1 | 6/2011 | Yuan et al. |
| 2012/0080943 A1 | 4/2012 | Phadke |

OTHER PUBLICATIONS

Mirhosseini, M., et al., "Single- and Two-Stage Inverter-Based Grid-Connected Photovoltaic Power Plants With Ride-Through Capability Under Grid Faults," IEEE Transactions on Sustainable Energy, vol. 6, No. 3, pp. 1150-1159, (Jul. 2015).
Office Action and Search issued in connection with corresponding DE Application No. 102016120033.6 dated Jun. 30, 2017.
Extended European Search Report and Opinion issued in connection with corresponding EP Application No. 17197368.8 dated Apr. 4, 2018.

\* cited by examiner

METHOD FOR CONTROLLING A PHOTOVOLTAIC INVERTER FOR NETWORK FAULT RIDE-THROUGH AND A PHOTOVOLTAIC INVERTER SYSTEM

BACKGROUND OF THE INVENTION

This invention relates to a method for controlling a photovoltaic inverter for the ride-through of a network fault and a photovoltaic inverter system.

Decentralized energy generation plants, photovoltaic (PV) plants, are increasingly being used to feed energy into public or private supply networks. PV plants use inverters to convert DC power generated by a PV generator into AC power. In the case of network coupling, the inverters operate on the output side phase-synchronously with the network so that they generate an AC voltage corresponding to the frequency and amplitude of the network voltage and a suitable AC current. Inverters are known in various topologies with half-bridge or full-bridge circuits which include pulsable semiconductor switching elements, generally power MOSFETs, IGBTs, etc., which are suitably controlled at high frequencies in order to produce the required AC current of the desired phase and amplitude.

In order to obtain the highest possible yield, a PV generator is operated at a so-called maximum power point (MPP), which is the point in the current-voltage diagram of the PV generator at which the greatest power can be drawn, i.e. at which the product of the current and voltage is maximized. The MPP operating point is not constant, but rather depends on the irradiance, the temperature, the type of solar cells and other factors. In a PV inverter, the MPP operating point is often set by a so-called MPP tracker which adjusts the voltage of the PV generator to a suitable value.

As ever more and ever larger-sized PV energy generation plants are put into operation and connected to supply network, many network operators and countries are demanding that PV generators remain connected to the electrical power supply network from a specific minimum power in the event of small controllable network faults and continue to supply power to the network, in order to prevent an unintended simultaneous shutdown of the feed-in powers and thus breakdowns of the entire network. For example, the Medium-Voltage Directive in Germany requires that energy generation plants, including PV plants, with more than 100 kW peak power, which feed their power into the medium-voltage network, must, in the event of a short-circuit in the network, remain connected to the network and must make a specific short-circuit current available. This is known as fault ride-through (FRT) and is also referred to as low-voltage ride-through (LVRT) or zero-voltage ride-through (ZVRT). According to the German Medium-Voltage Directive, a specific reactive current must be fed as a short-circuit current of around 90% of the nominal current in the case of voltage dips of 50%. Similar feed-in directives also exist in other countries around the world.

There is a risk that an inverter system will be damaged due to an overvoltage in its DC circuit if it is connected to the network during an FRT. Since the PV generator continues to supply power to the DC voltage link, the DC link voltage can rise to values close to the open-circuit voltage of the PV generator if the AC voltage is reduced significantly during the FRT event. This increase in the DC link voltage can damage the power semiconductor switch used in the inverter if its nominal voltage values are exceeded. On the other hand, the use of sufficiently voltage-proof power semiconductor switches can be expensive.

The high increase in the DC link voltage leads to a natural limitation of the DC voltage due to the output characteristic curve of the PV generator, while at the same time also limiting the current supply capability of the inverter if its power semiconductor switch can no longer commutate the required short-circuit current at a high DC link voltage.

To overcome this problem, U.S. Pat. No. 8,687,328 B2 proposes using a crowbar known as a brake chopper to prevent an increase in the DC link voltage during an FRT event. This clamping circuit (the brake chopper) comprises a series circuit consisting of a controllable switch and a brake resistor which is connected to the DC voltage link parallel to the PV generator to dissipate energy from the PV generator and convert it into thermal energy in the brake resistor. Consequently, the DC link voltage can be clamped to a desired maximum value.

In particular, U.S. Pat. No. 8,687,328 B2 proposes, in the event of a network voltage dip, detecting the operating voltage of the PV generator directly before the occurrence of the network voltage dip and closing the switch of the clamping circuit when it is detected that the operating voltage of the PV generator exceeds a predetermined threshold value of the operating voltage of the PV generator directly before the network voltage dip, and opening the switch of the clamping circuit when it is detected that the operating voltage of the PV generator has fallen below the value of the operating voltage of the PV generator directly before the network voltage dip. The voltage across the link is thus maintained in a range between the voltage of the PV generator directly before the network voltage dip and the upper threshold value which is higher by a differential voltage AV, and generally fluctuates between these two limit values during the FRT event.

However, if the operating voltage of the PV generator directly before the network voltage dip is relatively low due to shadowing effects, low temperature, etc., it may happen that the activated clamping circuit is not capable of holding the increasing operating voltage of the PV generator. The operating voltage of the PV generator can then increase even though energy is dissipated from the link via the brake resistor of the clamping circuit and converted into thermal energy. This results in unnecessary energy losses.

BRIEF DESCRIPTION OF THE INVENTION

As a result of this, an aspect of the invention provides an improved and simplified method of controlling a photovoltaic inverter for ride-through of a network fault and an associated photovoltaic inverter system to prevent the aforementioned disadvantages. In particular, an aspect of the invention provides such a method and a photovoltaic inverter system which enable a simplified ride-through of a network fault with reduced losses.

To achieve this, a method of controlling an inverter having the features of claim 1 and an inverter system according to claim 8 are provided.

According to one aspect of the invention, a method of controlling a photovoltaic (PV) inverter connected between a PV generator and a power supply network for ride-through of a network fault is provided. The method involves the detection of a voltage dip in the network voltage. The method further comprises monitoring of the voltage of a DC link on a DC voltage input of the inverter. The method further comprises detecting when the DC link voltage exceeds an upper limit value, wherein the upper limit value corresponds to a saturation voltage in a specific $I_{ac}/U_{dc}$ characteristic curve of the inverter, above which the maximum undulatory output current of the inverter decreases. The method further comprises, in the case of a network voltage dip and exceeding the upper limit value, activating a power dissipation device connected in parallel to the DC voltage link to dissipate power from the DC voltage circuit as required, and controlling the power dissipation device to maintain the DC link voltage within a range between the upper limit value and a lower limit value, which is smaller than the upper limit value by a predetermined voltage difference.

The method described in an embodiment of the invention thus makes it possible to keep a PV energy generation plant connected to a network, e.g. a public supply network, to operate it and to feed in a required short-circuit current when the network voltage falls below a certain threshold, e.g. 50% or less, depending on the requirement or directive. In this case, the method provides for clamping of the DC link voltage to a predefined value, the upper limit value, which corresponds to the saturation voltage. The upper limit value is not determined during operation, in each case as a function of the instantaneous operating conditions, but rather it is determined and fixed in advance. In general, the maximum output AC current of an inverter, i.e. the maximum deliverable output current of the inverter in terms of its amplitude when applied across the DC input voltage, is largely constant below a maximum rated voltage, which is referred to here as the saturation voltage, while the maximum output AC current for DC input voltages which are higher than the saturation voltage decreases. The saturation voltage from which the maximum AC output current of the inverter starts to decrease is used here as the upper limit value for clamping the DC link voltage by means of the energy dissipation device.

In an embodiment, the saturation voltage depends on the topology of the inverter and the power semiconductor switch types used in it. It can thus be determined empirically in advance according to the method or measured and stored at the respective inverter or inverter type, so as to be used in the case of an FRT event.

During the normal operation of the inverter and the PV generator when there is no network voltage dip, the saturation voltage is generally higher than the highest MPP voltage of the PV generator or than an upper voltage limit value of an MPP tracking window. This ensures that the inverter is capable of generating and supplying the required short-circuit current during an FRT event at all operating points of the PV generator.

In embodiments, the method further comprises performing an MPP (maximum power point) tracking to operate the PV generator at maximum power points (MPP) that depend on the respective operating conditions, when no voltage dip is detected in the network voltage. As soon as a network voltage dip is detected, the method further comprises interrupting the MPP tracking and storing the value of the MPP DC link voltage directly before the network voltage dip. The method further comprises, as soon as it is detected that a network voltage dip is not present, that the energy dissipation device is deactivated and the MPP tracking is resumed, whereby the DC link voltage is set to the value of the MPP DC link voltage directly before the network voltage dip. After a recovery of the network, a photovoltaic plant can return to normal operation relatively quickly from the temporarily stored operating point before the occurrence of the voltage dip.

The method may further comprise determining reference values for the current to be fed into the network as soon as a network voltage dip is detected, and controlling and regulating the inverter depending on the currently detected DC link voltage and the current's reference values to feed the required short-circuit current into the network as long as the network voltage dip is present. The current to be fed can, depending on the requirement, be active current and/or reactive current, the strength of which is predetermined by the respective network operator or the respective directive.

In an embodiment, the activation and control of a power dissipation device comprises the activation and control of a brake chopper which is connected in parallel to the PV generator at the DC voltage link, and at least one series circuit consisting of a controllable switch and a brake resistor for converting electrical energy from the DC voltage link into thermal energy. Thus, with a simple circuit and suitable control of the brake chopper, the DC link voltage can be limited, as required, to a suitable upper value, the saturation voltage, to enable the FRT to be performed in a simple manner and with small losses and to prevent damage to the power semiconductor switches of the inverter.

According to a further aspect of the invention, an inverter system for a photovoltaic (PV) plant is provided. The inverter system comprises an inverter for converting a DC power of a PV generator into an AC voltage power for feeding into a power supply network and a DC voltage link at the DC voltage input of the inverter for connection to the PV generator. The inverter system further comprises a power dissipation device connected in parallel to the DC voltage link for dissipating power from the DC voltage link when required. The inverter system also has a detection device which is configured to detect the network voltage and the DC link voltage, as well as to generate their characteristic signals. The inverter system also has a control device for controlling the inverter and the energy dissipation device, wherein the control device is connected to the detection device by communication means. The control device is configured to detect a voltage dip in the network voltage. The control devices is further set up to detect when the DC link voltage exceeds an upper limit value, wherein the upper limit value corresponds to a saturation voltage in a specific $I_{ac}/U_{dc}$ characteristic curve of the inverter, above which the maximum AC output current of the inverter decreases. The control devices is further set up, in the case of a network voltage dip and exceeding the upper limit value, to activate and control the power dissipation device to maintain the DC link voltage within a range between the upper limit value and a lower limit value, which is smaller than the upper limit value by a predetermined voltage difference.

The inverter system allows a reliable ride-through of network faults in the event of a dip or failure of the network voltage with simple means and with reduced losses. The advantages and embodiments, as explained above in connection with the method described in an embodiment of the invention, also apply analogously to the inverter system.

The inverter of the inverter system is a single-stage, network-connected inverter with a DC voltage link, which has a circuit arrangement with controllable power semiconductor switches. Power MOSFETs or IGBTs are used as the switches of the inverter. In principle, thyristors, IGCTs, etc. could also be used.

The inverter system may include an MPP tracking unit for performing an MPP tracking to operate the PV generator at maximum power points (MPP) that depend on the respective operating conditions, when no voltage dip is detected in the network voltage. The control device can then also be configured to deactivate the MPP tracking unit as soon as a network voltage dip is detected, to store the value of the MPP link voltage directly before the network voltage dip, and, as soon as it detects that a network voltage dip is no longer present, can deactivate the power dissipation device and activate the MPP tracking unit, whereby the DC link voltage can then be set to the value of the MPP DC link voltage directly before the network voltage dip. The PV plant can then return to the normal operating mode relatively quickly after the recovery of the network.

The control device can also be configured to determine a reference value for the current, active and/or reactive current to be fed into the network, as soon as a network voltage dip is detected, and to control the inverter depending on the currently detected DC link voltage and the current's reference value, in order to feed the required short-circuit current into the network as long as the network voltage dip is present.

For the saturation voltage, what was already stated in connection with the method according to an embodiment of the invention applies. It is dependent on the topology of the inverter and the power semiconductor switches used in it, and can be determined empirically or by measurement on the inverter or an inverter of the same type and stored in a storage device of the inverter. The saturation voltage is higher than the maximum MPP voltage of the PV generator and/or higher than an upper voltage limit value of an MPP tracking window in the normal operation of the inverter and the PV generator, if no network voltage dip is present, but is sufficiently limited so that, in the event of an FRT, the required short-circuit current can be generated and fed into the network.

In an embodiment of the invention, the energy dissipation device can have a brake chopper which is connected to the DC voltage link so as to be arranged parallel to the PV generator during operation, and the at least one series circuit comprising a controllable switch, a power MOSFET or IGBT, and a brake resistor for converting electrical energy into thermal energy. Such a power dissipation device has a simple design and can be operated in a simple manner to limit the DC link voltage to a maximum voltage value suitable for the FRT operation.

BRIEF DESCRIPTION OF THE DRAWINGS

Further advantageous details of the invention result from the subordinate claims, the drawings and the associated description. The drawing is a non-limiting exemplary embodiment of the invention, wherein identical reference numerals are used in all figures to indicate identical elements. The figures show the following:

DETAILED DESCRIPTION

Figure 1:
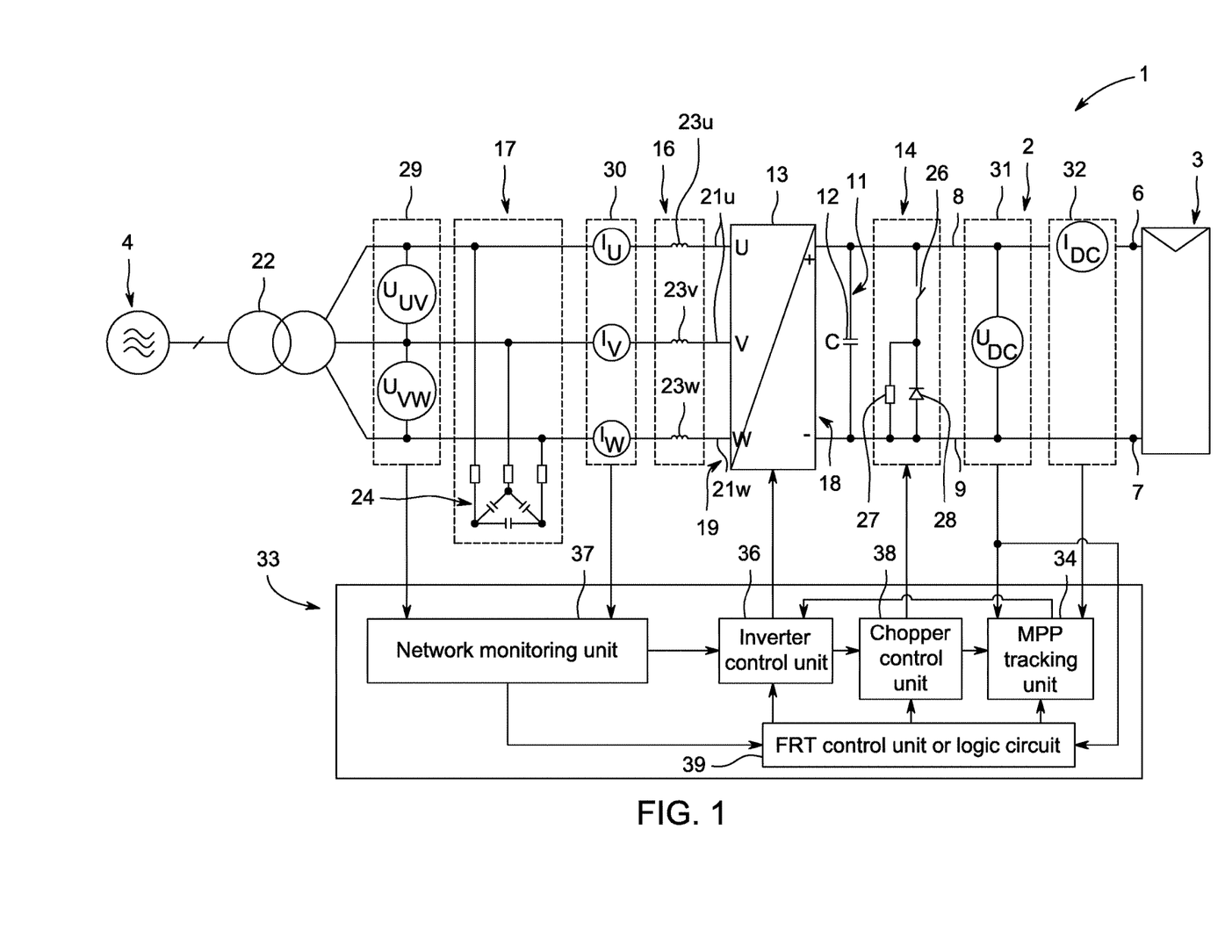
FIG. 1 a block circuit diagram of an exemplary photovoltaic plant with an inverter system.

FIG. 1 illustrates photovoltaic (PV) energy generation plant 1, serving to convert solar radiation into electrical energy and feed it into a network. The PV plant 1 contains an inverter system 2, which is connected electrically between a PV generator 3 and a power supply network 4, e.g. a public medium-voltage supply network.

PV generator 3 is constructed from one or a plurality of PV modules which convert incident light from the sun into electrical energy. PV generator 3 has electrical connections which are connected to a positive and a negative DC voltage connection 6, 7 of the inverter system 2. DC voltage branches 8, 9 extend from the DC voltage connections 6, 7 to a DC voltage link 11 of the inverter system 2.

The DC voltage link 11 is represented here by a capacitor C, 12, but can also be formed from a series connection and/or parallel connection of capacitors. In any case, the at least one DC link capacitor 12 serves as storage means for storing the energy supplied by the PV generator 3, which is supplied to the inverter system 2.

In the embodiment shown, the inverter system 2 has, in addition to the DC link capacitor 12, an inverter 13, a brake chopper 14, a power choke device 16 and a network filter device 17.

The inverter 13 is provided for converting the DC voltage $U_{dc}$ applied to the link 11 into an output-side AC voltage. The inverter 4 is connected in parallel to the capacitor 12 to the DC voltage branches 8, 9. Although not illustrated in FIG. 1, it is designed in the form of a circuit arrangement with a bridge circuit, e.g. based on a half-bridge or full-bridge, with pulsable switch elements, which are designed as power semiconductor switches in the form of power MOSFETs or IGBTs. The power semiconductor switches are switched according to a predefinable clock pattern with high frequencies in the kHz range to invert the DC link voltage $U_{dc}$.

The inverter 13 is a one-stage network-driven inverter which, as shown in FIG. 1, converts the DC voltage $U_{dc}$ of the link 11 at its DC voltage input 18 into an AC voltage, in this case in particular three-phase AC voltage, at its output 19, which is adapted to the amplitude and phase of the network voltage and is here generally referred to as $U_{ac}$. The individual phases are designated in FIG. 1 as U, V and W.

The three-phase output 19 of the inverter 13 is connected electrically to the network 4 via a transformer 22 via AC voltage phase branches $21u$, $21v$, $21w$. In the AC voltage branches 21, the power dissipation device 16 is arranged, which has a power choke device $23u$, $23v$, $23w$ in each phase branch $21u$, $21v$ and $21w$ respectively, which smooths the output AC signals of the inverter 13 to filter out higher-frequency interferences caused by the clocking of the power semiconductor switches of the inverter 3 to keep them out of the network 4.

In addition, on the AC voltage branches 21 is arranged the network filter device 17, which has an RC network 24 with three capacitors in a triangular circuit and three resistors connected to them, and which serves to suppress the clock-frequency components of the generated conductor-to-conductor voltages.

The phase branches $21u$, $21v$, $21w$ are connected to the network 4 via the optional transformer 22, which is here a medium-voltage transformer which converts the voltage and current levels to the low-voltage level at the phase branches 21 into the corresponding current and voltage levels of the medium-voltage level of the network 4.

As can also be seen in FIG. 1, on the DC voltage side of the inverter 13, the brake chopper 14 is connected to the DC voltage link 11 such that it is arranged parallel to the PV generator 3 during operation. The brake chopper 14 serves as a power dissipation device, in order to dissipate and consume excess energy therefrom, in particular in the event of an overvoltage at the DC voltage link 11. For this purpose, the brake chopper 14 has a controllable switch 26 which is connected in series to a brake resistor 27 and a diode 28, which are arranged parallel to one another. In the closed state of the switch 26, a current flows through the brake resistor 27, which then converts energy from the DC voltage link 11 into thermal energy. The diode 28 is used for current commutation during the shutdown of the switch 26 in order to protect it.

The inverter system 2 also has a measuring device used to detect operating parameters in the inverter system 2 during operation, in order to generate characteristic signals which can be used for the purpose of controlling the PV plant 1. The measuring device includes a detection device 29 for detecting the network voltage $U_{ac}$ which e.g. detects here the voltage $U_{UV}$ between the phase branches 21$u$, 21$v$ and the voltage $U_{VW}$ between the phase branches 21$v$, 21$w$. The measuring device also includes a detection device 30 which detects the phase currents $I_U$, $I_V$ and $I_W$ in the phase branches 21$u$, 21$v$ and 21$w$.

Still further, the measuring device comprises detection devices 31, 32 which detect the DC link voltage $U_{dc}$ or the link current $I_{dc}$ at the DC voltage link 11 between the DC voltage branches 8, 9.

All of these detection devices 29-32 are connected by communication means to a control device shown in FIG. 1 as a block 33, which serves to control the inverter system 2 or the PV plant 1 based on the measurement signals supplied by the measuring devices 29-32. The control device 33 has an MPP (maximum power point) tracking unit 34, an inverter control unit 36, a network monitoring unit 37, and a chopper control unit 38.

The MPP tracking unit 34 is provided for performing an MPP tracking algorithm to set the optimal operating point with maximum power output of the PV generator 3 during normal operation and to continuously adjust the operating point. For this purpose, the MPP tracking unit 34 receives the instantaneous measuring signals, which characterize the DC link voltage and the link current, from the detection devices 31, 32, and generates reference current or voltage signals for the inverter control unit 36. Like the other units 36-38 of the control device 33, the MPP tracking unit can also be implemented in the form of an application-specific integrated circuit (ASIC), as software, firmware, hardware or another technology.

The inverter control unit 36 receives signals from the detection device 29, 30 which characterize the phase voltages and phase currents on the network side of the inverter 13 and the voltage reference values from the MPP tracking unit 34, and controls the power semiconductor switches of the inverter 13 appropriately, starting from the DC link voltage $U_{dc}$, to generate a corresponding AC $I_{ac}$ suitable for feeding into the network 4.

The network monitoring unit 37 monitors the signals supplied by the detection devices 29, 30 and is configured to detect network faults, including voltage dips of the network voltage.

The chopper control unit 38 is provided for controlling the brake chopper 14. For example, the chopper control unit 38 can close the switch 26 of the brake chopper 14 in the event of an overvoltage at the DC voltage link 11 in order to dissipate energy from the DC voltage link 11 and convert it into thermal energy in the brake resistor 27. The chopper control unit 38 also serves to activate the brake chopper 14 in the event of a network voltage dip to perform a network fault ride-through (FRT), so as to prevent the PV plant 1 from continuing to operate and allow a continued feed of current into the network 4.

The increasingly stringent directives and rules for the connection and parallel operation of energy generation plants in networks all over the world require that the energy generating plants can ride through a network fault by not shutting down off themselves, but instead remaining connected to the network and feeding a specific current, generally a reactive current, to the fault to help in clearing the fault and triggering the protective devices. For example, in some European countries, the supply of a maximum short-circuit current at approximately the rated current is required in the case of voltage dips of 50%.

The control device 33 therefore has an FRT control unit or logic circuit 39, which enters an FRT operating mode for the ride-through of the network fault in the event of a network dip or breakdown. As soon as the network monitoring unit 37 detects a dip or breakdown of the network voltage, it communicates this to the FRT control unit 39. The FRT control unit 39 then ends the normal operation mode by disabling the MPP tracking unit 34, and instructs the inverter control unit 36 to operate the inverter 13 according to the DC voltage $U_{dc}$ of the DC voltage link circuit 11 so that the required short-circuit current continues to be fed up to the maximum rated current into the network 4. The FRT control unit 39 also monitors the DC link voltage $U_{dc}$ to detect an impermissible increase in the DC link voltage and, if necessary, instructs the chopper control unit 38 to limit the DC link voltage to permissible values by means of the brake chopper 14.

In the event of a dip or breakdown of the network voltage, the DC link voltage of a photovoltaic plant 1, e.g. the PV plant in FIG. 1, jumps to values close to the open-circuit voltage of the PV energy source, e.g. the PV generator 3, because the AC power during the network fault is significantly reduced. This increase in the DC link voltage $U_{dc}$ leads to a natural limitation of the DC voltage power on the DC side of the inverter, but at the same time limits the current supply capability of the inverter, if the power semiconductor switches cannot commute the current in the required amount, e.g. the rated current, at a high DC link voltage. To overcome this problem the brake chopper 14 is used to prevent an unacceptable increase in the DC link voltage $U_{dc}$ during a network fault.

Figure 2:
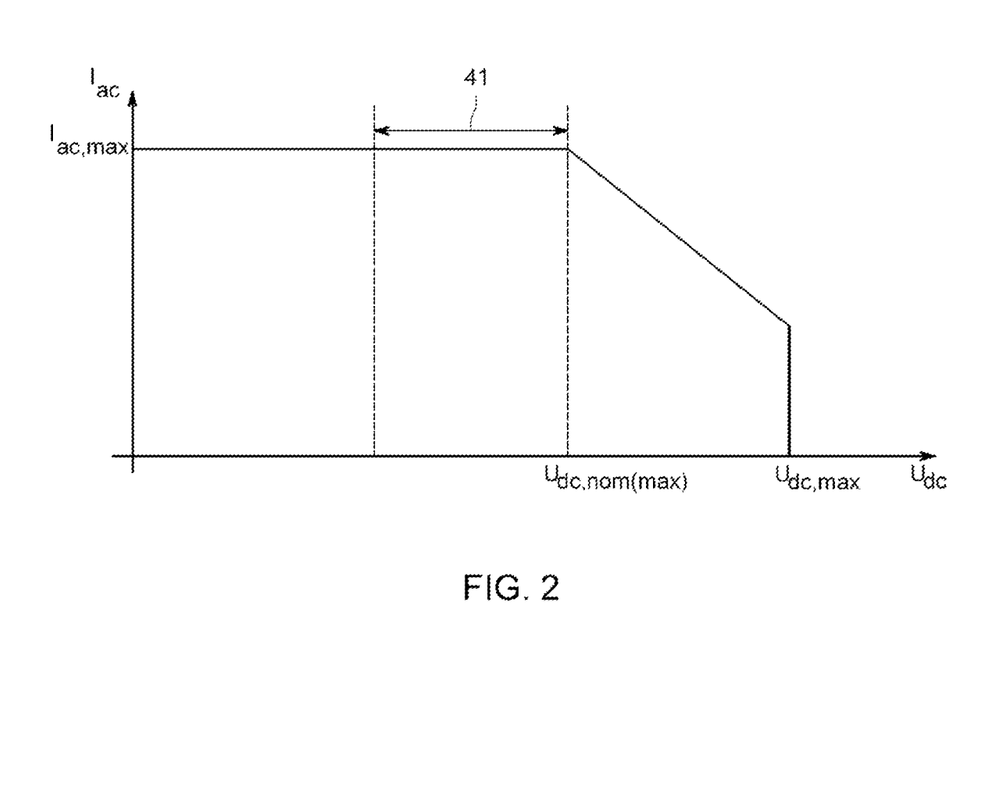
FIG. 2 an $I_{ac}/U_{dc}$ characteristic curve of an exemplary inverter illustrating the current feed capability of an inverter, depending on the voltage at the DC voltage input of the inverter.

FIG. 2 shows an $I_{ac}/U_{dc}$ characteristic curve illustrating the current supply capability of an exemplary inverter. The maximum AC output current $I_{ac,max}$ is applied, i.e. the maximum AC output current $I_{ac,max}$ deliverable by the inverter, depending on the DC link voltage $U_{dc}$, the DC input voltage of the inverter. As can be seen, the maximum AC output current $I_{ac,max}$ is largely constant over a wide range of the DC voltage $U_{dc}$. As further shown in FIG. 2, the maximum current decreases in amplitude above a certain limit voltage, the saturation voltage $U_{dc,nom(max)}$, which may be referred to herein as the maximum rated voltage. For DC link voltages $U_{dc}$ which are higher than the saturation voltage $U_{dc,nom(max)}$ and up to the maximum DC link voltage $U_{dc,max}$ the maximum AC output current $I_{ac,max}$ of the inverter decreases faster and faster.

Although the specific values for $I_{ac,max}$, $U_{dc,nom(max)}$ and $U_{dc,max}$ are specific to each inverter and are dependent on the topology of the inverter and the power semiconductor switches used in it, the $I_{ac}/U_{dc}$ characteristics of various inverter have substantially the same path with a characteristic saturation voltage $U_{dc,nom(max)}$, which indicates the transition to decreasing maximum AC values with further increasing DC link voltage values. To give only one example, in inverters which can be operated up to a maximum DC input voltage of 1,500 V, the saturation voltage $U_{dc,nom(max)}$ can be approx. 1,300 V, for example.

In the normal operation of the inverter, the upper limit value of the MPP tracking window 41 shown in FIG. 2, in which the MPP tracking unit 34 operates the PV plant, is always slightly lower than the saturation voltage $U_{dc,nom(max)}$, so that the inverter 13 provides the rated current for the specific MPP range.

In the event of a network voltage dip, the output power decreases proportionally to the network voltage. Because of the reduction of the output power, the DC link voltage $U_{dc}$ increases to limit the DC voltage power. Depending on the residual voltage during the network fault, the DC link voltage $U_{dc}$ could increase to values near the open-circuit voltage of the PV generator 3. According to the directives and rules of the network operators, e.g. the Medium-Voltage Directive in Germany, the inverter during the FRT (LVRT or ZVRT) must remain connected to the network and feed in reactive power. The amplitude of the reactive current to be injected must be at least 90% of the rated current for the FRT at a residual voltage of less than 50%.

As shown in FIG. 2, the current supply capability of the inverter decreases significantly during an FRT event if the DC link voltage $U_{dc}$ increases to values above the saturation voltage $V_{dc,nom(max)}$. Accordingly, the reactive current which could be fed during the FRT event is limited.

To solve this problem the brake chopper 14 is controlled as needed to dissipate the energy of the PV generator 4 and keep the DC link voltage $U_{dc}$ at a desired level below a predetermined limit value, so as to ensure a maximum current supply capability of the inverter during the FRT event. The predetermined limit value is the saturation voltage $U_{dc,nom(max)}$ as described above.

Figure 3:
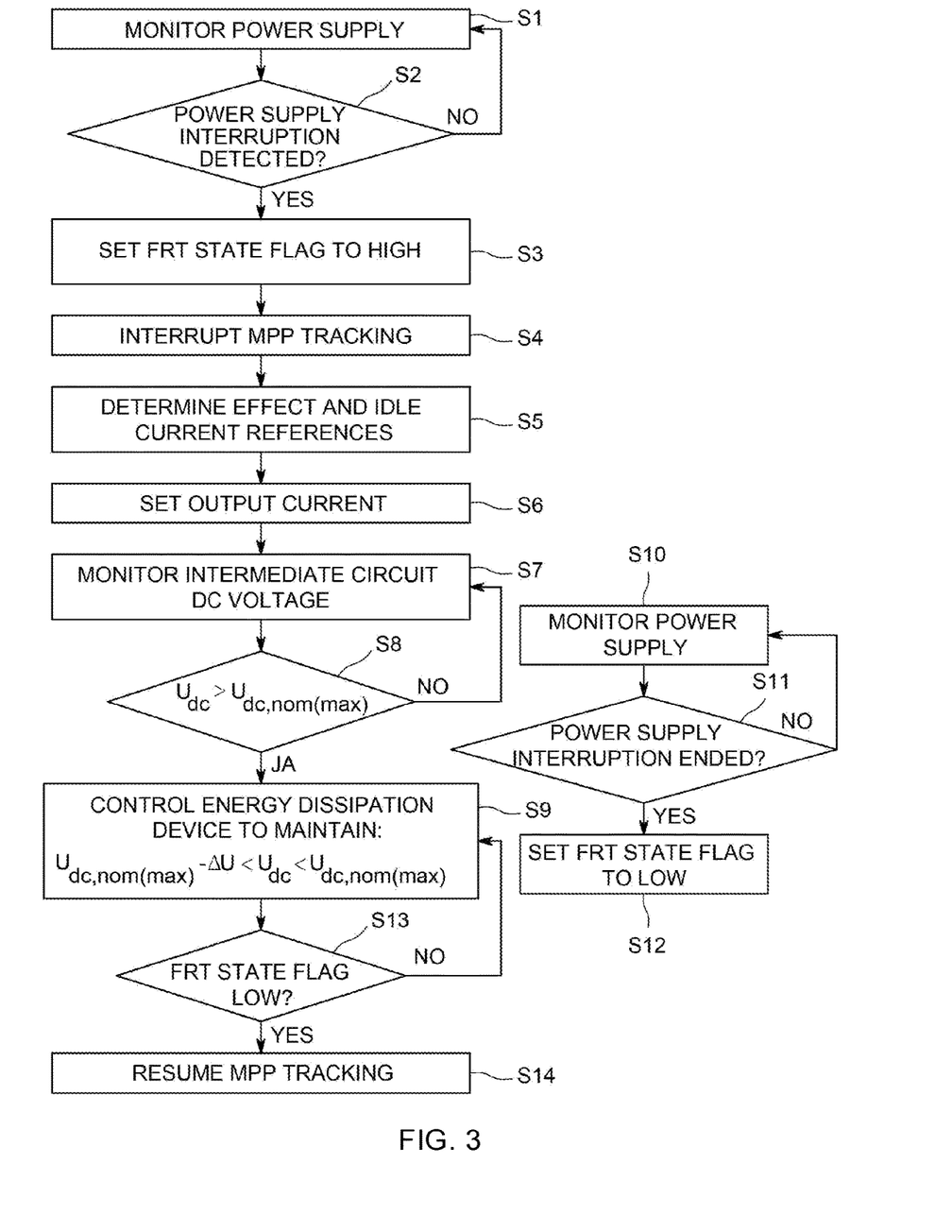
FIG. 3 a flow diagram of a method of controlling a photovoltaic inverter for ride-through of a network fault.

A flow diagram showing an embodiment of a method of controlling a photovoltaic inverter for the ride-through of a network failure, e.g. LFRT or ZVRT (generally FRT), will be explained in more detail below with reference to FIG. 3.

In step S1, the network voltage is monitored, e.g. by means of the network monitoring unit 37 in FIG. 1.

In step S2, it is checked whether a voltage dip is present. If no voltage dip is present (no at step S2), the process returns to step S1.

In step S2, if a voltage dip is detected (yes in step S2), then in step S3 an FRT state flag is set, e.g. to logical "high".

The MPP tracking is subsequently interrupted, in step S4, by example by deactivating the MPP tracking unit 34 in FIG. 1. In addition, in step S4, the value of the MPP DC link voltage $U_{dc,MPP}$ is stored directly before the network voltage dip for later reuse.

In step S5, the reference values for the active and reactive current are determined, and in step S6, the output current is set by a current control device (not shown in more detail here) to the desired value to for feeding into the network, e.g. the network 4 in FIG. 1. The inverter, e.g. the inverter 13 in FIG. 1, is controlled appropriately to supply the output current, depending on the DC link voltage $U_{dc}$. The DC link voltage $U_{dc}$ is monitored continuously, as indicated in FIG. 3 by step S7.

In step S8, it is checked whether the DC link voltage $U_{dc}$ exceeds a predetermined upper limit value $U_{THup}$. As mentioned above, the upper limit value $U_{THup}$ corresponds to the DC link voltage $U_{dc}$ of the specific saturation voltage $U_{dc,nom(max)}$ corresponding to the $I_{ac}/U_{dc}$ characteristic curve of the inverter used. The saturation voltage $U_{dc,nom(max)}$ corresponds to the voltage above which the maximum AC output current $I_{ac,max}$ of the inverter decreases. It depends on the topology of the inverter and the power semiconductor switches used in it. It is higher than the upper voltage limit of an MPP tracking window in the normal operation of the inverter and the PV generator when no network voltage dip is present, and may be determined empirically in advance before commissioning an inverter or measured at the respective inverter or inverter type. The value of the saturation voltage $U_{dc,nom(max)}$ as the upper limit value $U_{THup}$ is stored in a storage of the inverter system, e.g. a storage (not shown here) of the inverter system 2 in FIG. 1.

If it is detected in step S8 that the DC link voltage $U_{dc}$ exceeds the upper limit value, i.e. the value of the saturation voltage $U_{dc,nom(max)}$ ($U_{dc} > U_{dc,nom(max)}$) (yes in step S8), then the process proceeds to step S9. Otherwise (no in step S8), the process proceeds to continue to monitor the DC link voltage $U_{dc}$ in step S7 and continues to control the inverter in terms of feeding in the required short-circuit current.

If the DC link voltage $U_{dc}$ exceeds the saturation voltage $U_{dc,nom(max)}$ in step S9 an energy dissipation device is activated, which is arranged to transfer power from the DC voltage link, and controls the energy dissipation device in order to keep the DC link voltage $U_{dc}$ in a desired range of values between a lower limit value $U_{THlow}$ and an upper limit value $U_{THup}$. The upper limit value $U_{THup}$ corresponds to the value of the saturation voltage $U_{dc,nom(max)}$, and the lower limit value $U_{THlow}$ is lower by a predetermined voltage difference $\Delta U$ than the upper limit value $U_{THup}$. Thus, the energy dissipation device is controlled in order to keep the DC link voltage in the range $U_{dc,nom(max)} - \Delta U < U_{dc} < U_{dc,nom(max)}$.

According to an embodiment of the invention, as shown in FIG. 1, the energy dissipation device used to control the DC link voltage $U_{dc}$ in FRT mode is the brake chopper 14. As soon as the DC link voltage $U_{dc}$ exceeds the saturation voltage $U_{dc,nom(max)}$, the chopper control unit 38 closes the switch 26 of the brake chopper 14 to dissipate energy from the DC voltage link 11 and convert it into thermal energy in the brake resistor 27. The value of the brake resistor 27 is determined depending on the saturation voltage such that the brake chopper 14 is capable of reducing the DC link voltage $U_{dc}$ below the value of the saturation voltage $U_{dc,nom(max)}$. When the switch 26 of the brake chopper 14 is closed, the DC link voltage $U_{dc}$ thus decreases below the value of the saturation voltage $U_{dc,nom(max)}$.

As soon as the chopper control unit 38 detects that the DC link voltage $U_{dc}$ is below the lower limit $U_{THlow} = U_{dc,nom(max)} - \Delta U$, with $\Delta U$ of around 20 or 30 volts, the chopper control unit 38 opens the switch 26 of the brake chopper 14 to interrupt the power dissipation from the DC voltage link 11. Consequently, the DC link voltage $U_{dc}$ can then increase again. This process can be repeated, so that the DC link voltage oscillates back and forth between the lower limit value $U_{THlow}$ and the upper limit value $U_{THup}$.

It must be noted that, although in FIG. 1 an embodiment of a braking chopper 14 with a series circuit of a power semiconductor switch 26 and a brake resistor 27 is shown, which may be used as the energy dissipation device for performing the FRT operating mode, the energy dissipation device may in general also be implemented differently than as shown, if it is capable of limiting the DC link voltage $U_{dc}$ to the desired range.

In parallel to step S9, the control of the energy dissipation device, e.g. the brake chopper 14, for the FRT operation, in step S10, the network voltage $U_{ac}$ continues to be monitored, and it is checked in step S11 whether a network voltage dip or breakdown is still present. As long as no recovery of the network is detected in step S11 (NO in step S11), the monitoring of the network voltage in step S10 is continued in parallel to step S9. Otherwise, if a network recovery is detected (yes in step S11), the FRT state flag is set to logical "low" to indicate that the FRT operating mode is no longer required.

In step S13, the state of the FRT state flag is checked. If this is "high" (not "low") (NO in step S13), the DC link voltage $U_{dc}$ is kept within the desired range below the saturation voltage $U_{dc,nom(max)}$ by controlling the energy dissipation device, e.g. the brake chopper 14 in FIG. 1. Otherwise, if the FRT state flag is "low" (yes in step S13) then, in step S14, the FRT operating mode is ended and normal operating mode is resumed. In particular, the energy dissipation device, e.g. the brake chopper 14, is deactivated and the MPP tracking is resumed by means of the MPP tracking unit 34 in FIG. 1. In an embodiment the DC link voltage $U_{dc}$ is set to the previously stored value of the MPP DC link voltage $U_{dc,MPP}$ directly by the network voltage dip, so that the PV plant 1 can be returned relatively quickly to its normal operating mode.

Figure 4:
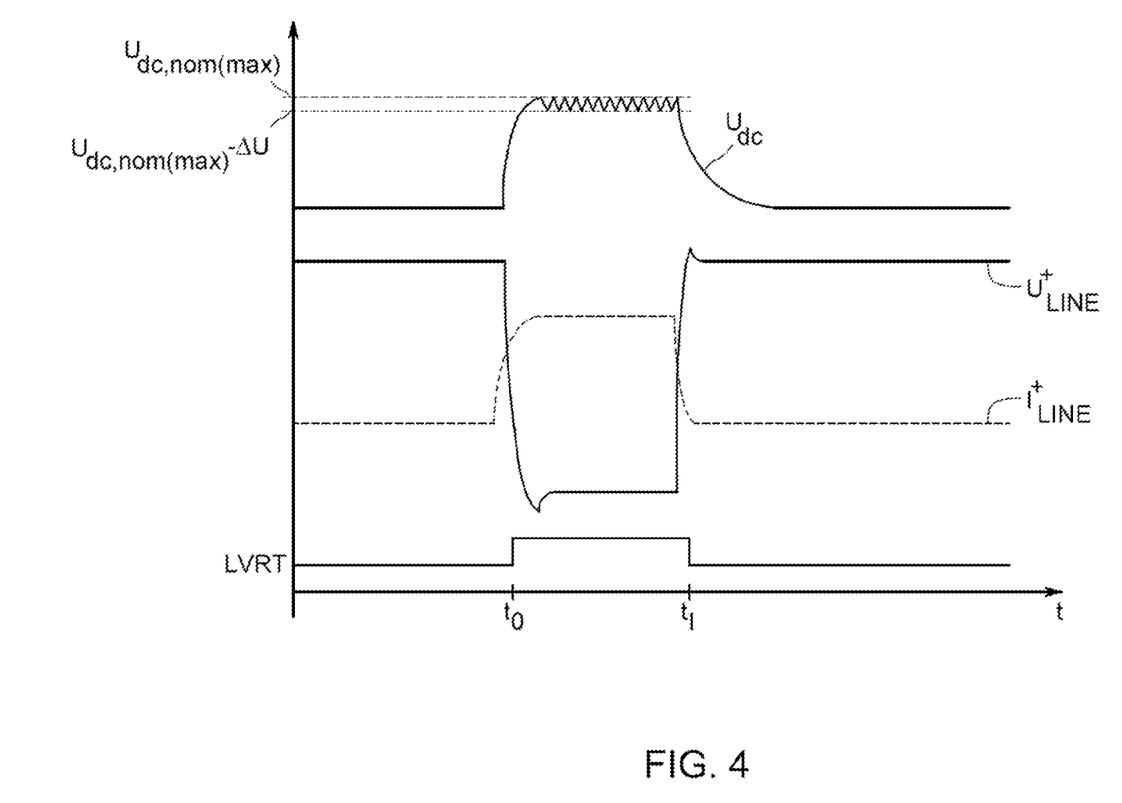
FIG. 4 exemplary paths of voltages and currents in a photovoltaic plant during the implementation of the method described for controlling a photovoltaic inverter for ride-through of a network fault when the DC link voltage exceeds a fixed upper limit value.

In FIG. 4, exemplary waveforms in the control of the energy dissipation device, in particular the brake chopper 14 according to FIG. 1, are shown during the FRT operating mode. Shown here are the course of the DC link voltage $U_{dc}$, the positive sequence component of the network voltage vector $U^+_{line}$, a reference value for the positive sequence component of the reactive current $I^+_{line}$, to be fed into the network, and the state of the FRT over time. At the time $t_0$, the network voltage collapses, and the FRT operating mode (here LVRT) is activated. The reference value for the reactive current to be fed into the network is set suitably, e.g. according to the rated current. The DC link voltage $U_{dc}$ increases and tends to exceed the saturation voltage $U_{dc,nom(max)}$. By the activation of the brake chopper 14, it is kept below the saturation voltage $U_{dc,nom(max)}$ within the range $U_{dc,nom(max)} - \Delta U < U_{dc} < U_{dc,nom(max)}$. The DC link voltage $U_{dc}$ thus fluctuates back and forth between the upper and the lower limit.

At the time t1, the network voltage recovers, the LVRT mode is ended and the DC link voltage $U_{dc}$ drops to normal levels corresponding to the power adjustment by the MPP tracking unit 34.

Figure 5:
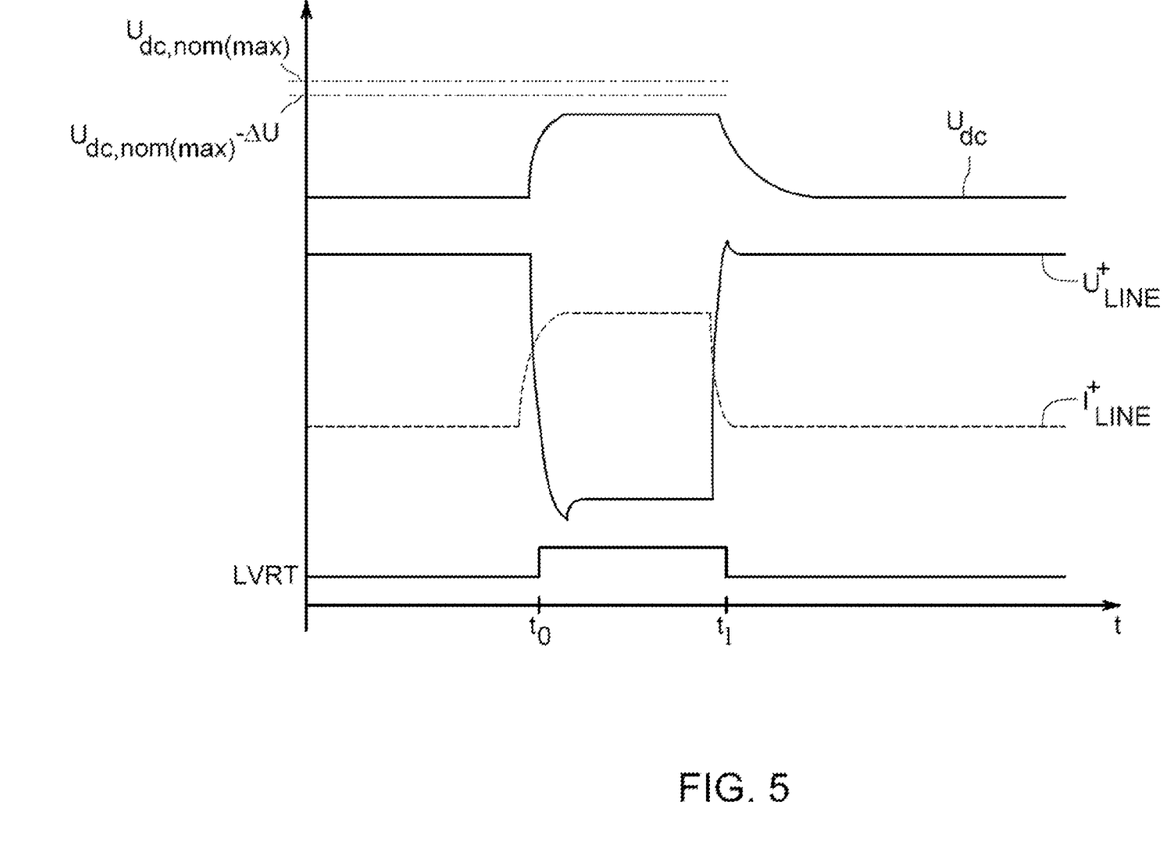
FIG. 5 exemplary paths of voltages and currents in a photovoltaic plant during the implementation of the method described for controlling a photovoltaic inverter for ride-through of a network fault when the DC link voltage does not exceed a fixed upper limit value.

In FIG. 5, a case is shown in which the DC link voltage $U_{dc}$, during the LVRT operating mode, does not increase to values above the saturation voltage $U_{dc,nom(max)}$ but, due to sunlight, the temperature of the PV generator and other operating conditions, remains below the saturation voltage $U_{dc,nom(max)}$. In an embodiment, the energy dissipation device, in particular the brake chopper 14 in FIG. 1, in this case, is not activated during the LVRT operating mode. No energy is wasted.

The choice of the inverter-specific saturation voltage $U_{dc,nom(max)}$ as the upper limit value for the control of the brake chopper 14 or the energy dissipation device is advantageous at least because the normal MPP operating range of the plant is below this value, the DC link voltage is limited to an upper limit value $U_{THup}$, which is suitably determined in advance and is not dependent on the respective operating conditions and must always be re-determined and an activation of the brake chopper 14 is minimized in the FRT mode, while the power semiconductor switches of the inverter 13 is efficiently protected against damage due to impermissible DC link voltage. According to an embodiment of the invention, the control of the inverter system 2 for ride-through of a network fault is simple but extremely efficient.

A method of controlling an inverter 13, which is connected between a photovoltaic generator 1 and a power supply network 4 for ride-through of a network fault, is disclosed. A voltage dip is detected in the network voltage and the voltage $U_{dc}$ of a DC voltage link 11 of the inverter 13 is monitored. When it is detected that the DC link voltage $U_{dc}$ exceeds an upper limit value $U_{THup}$, an operating mode for ride-through of the network fault (FRT) is started. The upper limit value $U_{THup}$ corresponds to a saturation voltage $U_{dc,nom(max)}$ in the specific $I_{ac}/U_{dc}$ characteristic curve of the inverter 14, above which the maximum AC output current $I_{ac,max}$ of the inverter 14 decreases. In the FRT operating mode, an energy dissipation device 14 is activated, which is adapted to dissipate power from the DC voltage link 11, if necessary, and is controlled to keep the DC link voltage $U_{dc}$ within a range $U_{dc} - \Delta U < U_{dc} < U_{dc, nom(max)}$ below the saturation voltage $U_{dc, nom(max)}$. An inverter system 2 for a photovoltaic plant 1 which implements the method also disclosed.

What is claimed:

1. A method of controlling an inverter, which is connected between a photovoltaic (PV) generator and a power supply network for ride-through of a network fault, the method comprising:
    detecting a voltage dip in a network voltage ($U_{ac}$);
    monitoring a DC link voltage ($U_{dc}$) of a DC voltage link at a DC voltage input of the inverter;
    detecting when the DC link voltage ($U_{dc}$) exceeds an upper limit value ($U_{THup}$), wherein the upper limit value ($U_{THup}$) of a saturation voltage ($U_{dc,nom(max)}$) corresponds to a specific $I_{ac}/U_{dc}$ characteristic curve of the inverter, above which a maximum AC output current ($I_{ac,max}$) of the inverter decreases; and
    activating a power dissipation device, which is connected in parallel to the DC voltage link to dissipate, if necessary, a power from the DC voltage link, and controlling the power dissipation device to keep the DC link voltage ($U_{dc}$) within a range between the upper limit value ($U_{THup}$) and a lower limit value ($U_{THlow}$), which is smaller by a predetermined voltage difference ($\Delta U$) than the upper limit value ($U_{THup}$).

2. The method described in claim 1, further comprising:
    performing a maximum power point (MPP) tracking to operate the PV generator at operating points of maximum power (MPP) dependent on respective operating conditions when no voltage dip in the network voltage ($U_{ac}$) is detected;
    interrupting the MPP tracking when a network voltage dip is detected, and storing a value of a MPP DC link voltage ($U_{dc,MPP}$) directly before the network voltage dip; and
    upon detecting that the network voltage dip no longer exists, deactivating the energy dissipation device and resuming the MPP tracking, wherein the DC link voltage ($U_{dc}$) is set to the value of the MPP DC link voltage ($U_{dc,MPP}$) directly before the network voltage dip.

3. The method described in claim 1, further comprising:
  determining reference values for a current to be fed into the power supply network as soon as a network voltage dip is detected, and
  controlling/regulating the inverter depending on the DC link voltage ($U_{dc}$) and reference values of the current, in order to feed a required short-circuit current into the power supply network, as long as the network voltage dip is present.

4. The method described in claim 1, wherein the saturation voltage ($U_{dc,nom(max)}$) is dependent on a topology of the inverter and one or more power semiconductor switches used in it.

5. The method described in claim 1, wherein the saturation voltage ($U_{dc,nom(max)}$) is higher than an upper voltage limit value of a maximum power point (MPP) tracking window in normal operation of the inverter and the PV generator if no network voltage dip is present.

6. The method described in claim 1, wherein the saturation voltage ($U_{dc,nom(max)}$) is determined in advance empirically or by measuring on the inverter or an inverter of the same type.

7. The method described in claim 1, wherein the activating of the power dissipation device and the controlling of the power dissipation device comprises activating and controlling a brake chopper connected in parallel to the PV generator at the DC voltage link, and at least one series circuit consisting of a controllable switch and a brake resistor for converting electrical energy into thermal energy.

8. An inverter system for a photovoltaic (PV) plant
  with an inverter for converting a DC voltage power of a PV generator into an AC voltage power to be fed into a power supply network,
  with a DC voltage link at a DC voltage input of the inverter for connection to the PV generator;
  with an energy dissipation device connected in parallel to the DC voltage link for dissipating power from the DC voltage link when required,
  with a detection device which is set up to detect a network voltage ($U_{ac}$) and a DC link voltage ($U_{dc}$) and to generate signals characteristic of the network voltage ($U_{ac}$) and the DC link voltage ($U_{dc}$),
  with a control device for control of the inverter and the energy dissipation device, wherein the control device is connected by communication means with the detection device and arranged to
  detect a voltage dip in the network voltage ($U_{ac}$);
  detect when the DC link voltage ($U_{dc}$) exceeds an upper limit value ($U_{THup}$), wherein the upper limit value ($U_{THup}$) of a saturation voltage ($U_{dc,nom(max)}$) corresponds to a specific $I_{ac}/U_{dc}$ characteristic curve of the inverter, above which a maximum AC output current ($I_{ac,max}$) of the inverter decreases; and
  activate and control the energy dissipation device to keep the DC link voltage ($U_{dc}$) within a range between the upper limit value ($U_{THup}$) and a lower limit value ($U_{THlow}$), which is smaller by a predetermined voltage difference ($\Delta U$) than the upper limit value ($U_{THup}$).

9. The inverter system described in claim 8, wherein the inverter is a single-stage network-driven inverter and the DC voltage link which has a circuit arrangement with controllable power semiconductor switches, power MOSFETs or IGBTs.

10. The inverter system described in claim 8, further comprising a maximum power point (MPP) tracking unit for performing MPP tracking to operate the PV generator at maximum power points that depend on respective operating conditions, when no voltage dip is detected in the network voltage ($U_{ac}$), wherein the control device is further arranged to:
  deactivate the MPP tracking unit as soon as the network voltage dip is detected, and store a value of a MPP DC link voltage ($U_{dc,MPP}$) directly before the network voltage dip; and
  as soon as it is detected that a network voltage dip no longer exists, to deactivate the energy dissipation device and activate the MPP tracking unit, wherein the DC link voltage ($U_{dc}$) is set to the value of the MPP DC link voltage ($U_{dc,MPP}$) directly before the network voltage dip.

11. The inverter system described in claim 8, wherein the control device can also be configured to determine a reference value for a current, active and/or reactive current to be fed into the network, as soon as the network voltage dip is detected, and to control/regulate the inverter, depending on the currently detected DC link voltage ($U_{dc}$) and the current's reference value, in order to feed the required short-circuit current into the network as long as the network voltage dip is present.

12. The inverter system described in claim 8, wherein the saturation voltage ($U_{dc,nom(max)}$) is dependent on a topology of the inverter and one or more power semiconductor switches used in it.

13. The inverter system described in claim 8, wherein the saturation voltage ($U_{dc,nom(max)}$) is higher than an upper voltage limit value of a maximum power point (MPP) tracking window in a normal operating mode of the inverter system and the PV generator if there is no network voltage dip present.

14. The inverter system described in claim 8, wherein the saturation voltage ($U_{dc,nom(max)}$) is determined in advance empirically or by measuring on the inverter or an inverter of the same type and is stored in a storage device of the inverter system.

15. The inverter system according to claim 8, wherein the energy dissipation device has a brake chopper connected to the DC voltage link so as to be arranged parallel to the PV generator during operation, and at least one series circuit comprising a controllable switch, a power MOSFET or IGBT, and a brake resistor for converting electrical energy into thermal energy.

* * * * *